June 7, 1949.                    F. W. KING                    2,472,328
                                SEPARABLE RIM
Filed Oct. 1, 1945                                         2 Sheets-Sheet 2
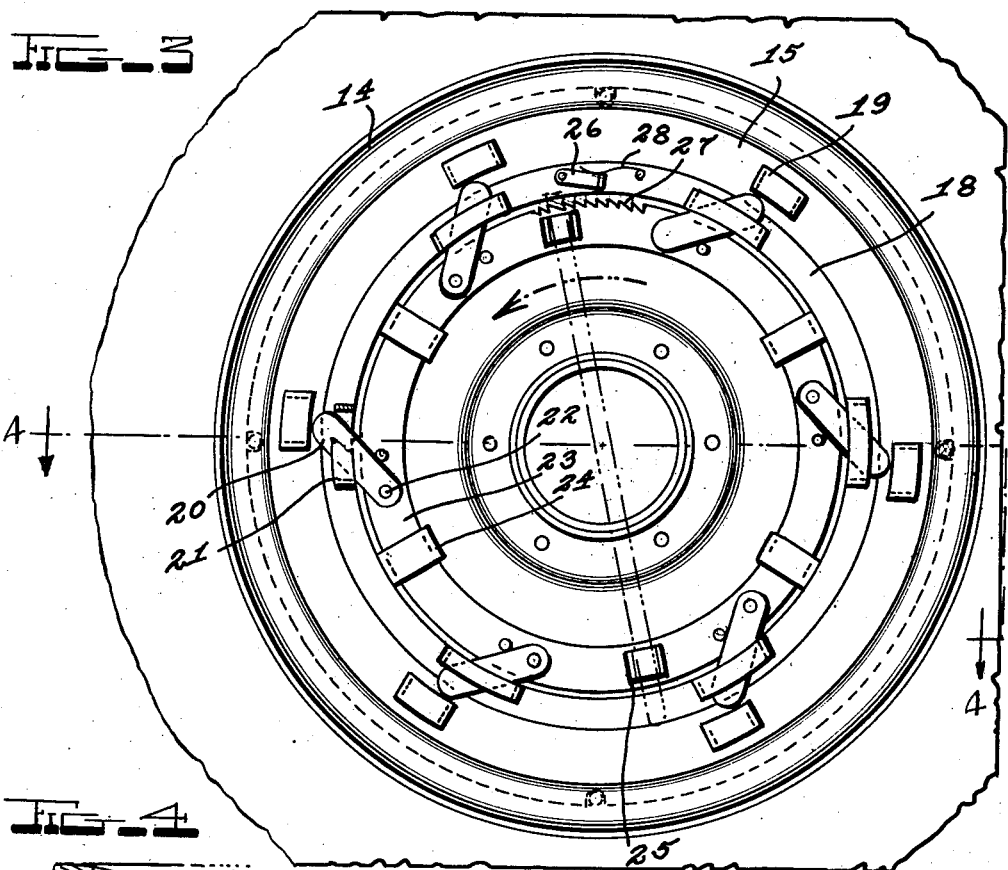
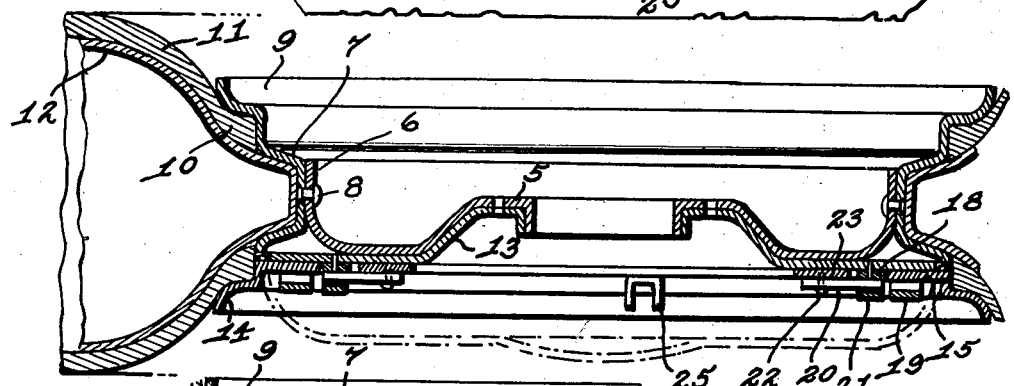
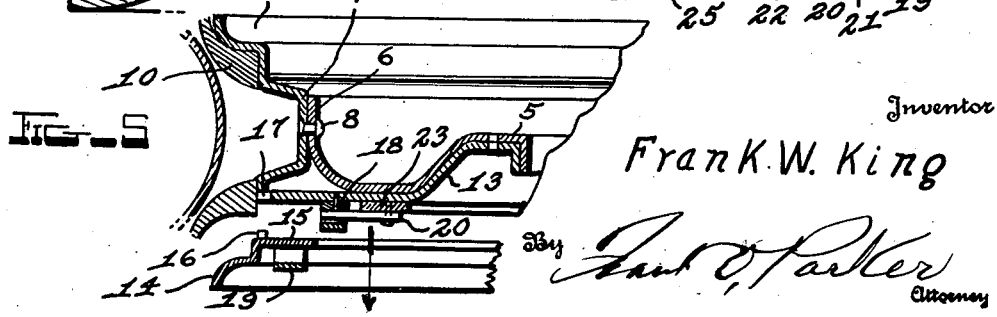
Inventor
Frank W. King Patented June 7, 1949

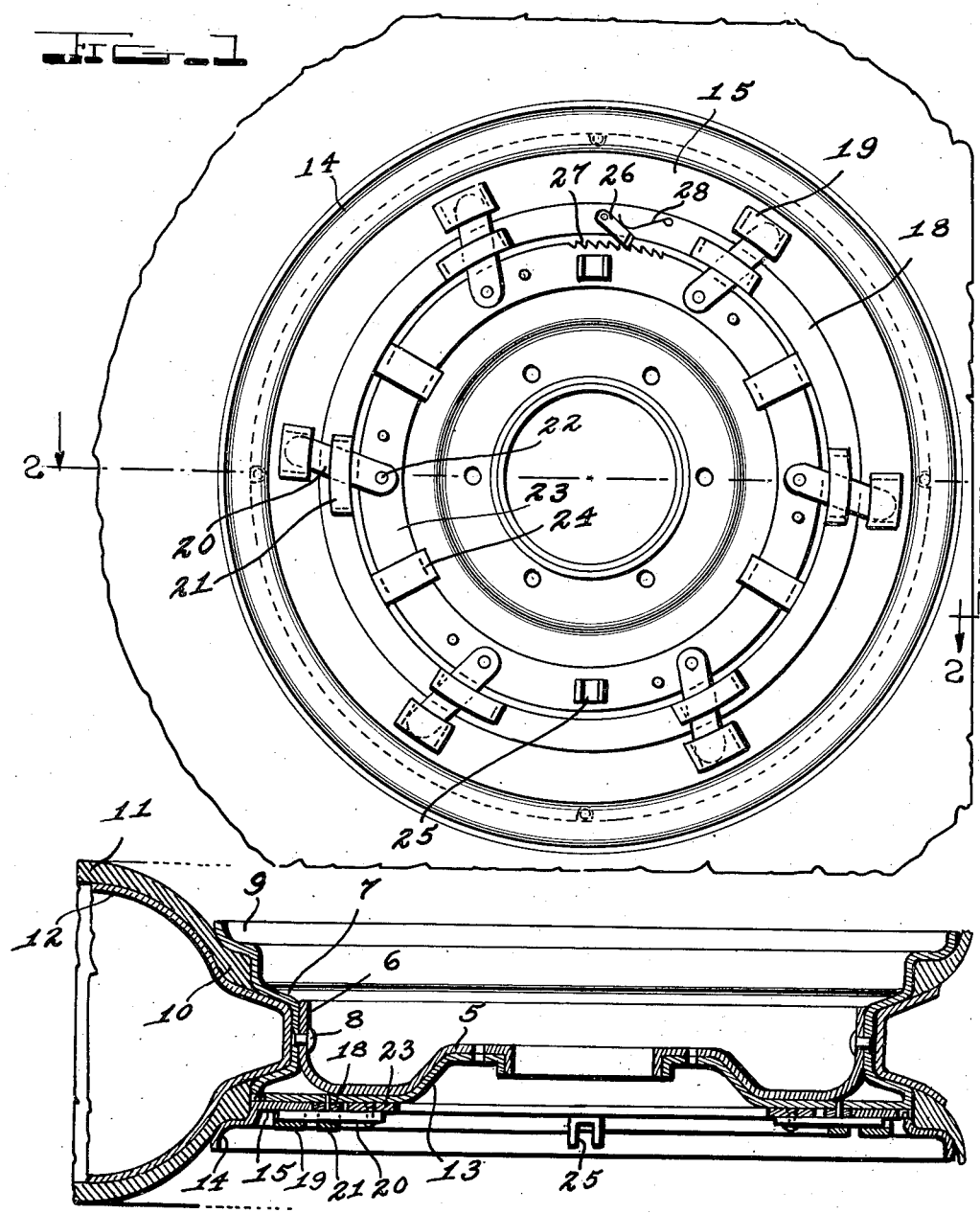

2,472,328

UNITED STATES PATENT OFFICE 2,472,328

SEPARABLE RIM

Frank W. King, Portland, Oreg.

Application October 1, 1945, Serial No. 619,563

3 Claims. (Cl. 152—402)

This invention relates to an improved separable rim for wheels of motor vehicles.

It is an object of the invention to provide a tire rim having a demountable section which is easily removed to permit changing of a tire without the necessity of removing the wheel.

A further object of the invention resides in providing manually operated mechanism for locking and releasing the demountable rim section so the tire may be changed with the minimum amount of labor and without damage to the tire.

Another object of the invention resides in providing a tire rim of the above-mentioned character which is simple and durable in construction, reliable and efficient in use and inexpensive to manufacture.

Other objects and advantages of the invention will be apparent during the course of the following description.

In the accompanying drawings forming a part of this specification and in which like numerals are employed to designate like parts throughout the same, Fig. 1 is a side elevational view of the improved rim mounted on a wheel, Fig. 2 is a cross section taken on the line 2—2 of Fig. 1, Fig. 3 is a side elevational view of the wheel with the rim locking mechanism in released position, Fig. 4 is a cross section taken on the line 4—4 of Fig. 3, and Fig. 5 is a detail section showing the demountable section of the rim removed.

In the drawings wherein for the purpose of illustration a preferred embodiment of the invention is shown the numeral 5 designates a disk wheel formed from a pressed circular plate having a peripheral flange 6 to support a tire rim 7 secured to the flange by rivets 8. The rim 7 is of the dropped center type and has an inner raised flange 9 to receive the bead 10 of a tire 11 having the usual inner tube 12. The outer edge of the rim is joined to the marginal edge of a face plate 13 which covers the outside of the disk wheel 5 and permits the tire when deflated to be easily removed from the rim. An outer demountable flange 14 secures the tire in place on the rim, the flange being formed integral with an annular ring 15 which abuts against the face plate 13 and has projecting lugs 16 adapted to enter openings 17 in the face plate 13 to secure the flange against rotating movement. The inner periphery of the ring 15 rests on the outer periphery of a ring 18 fixed to the face plate 13. The outer face of the ring 15 has a series of spaced pockets 19 adapted to receive the free ends of the locking dogs 20 which pass through guide loops 21 formed on the ring 18. The opposite ends of the dogs 20 are pivotally attached, as at 22, to a rotatable ring 23 which is movable in the loops 24 attached to the face plate 13. Attached to opposite sides of the rotatable ring are clips 25 adapted to receive a bar or other suitable tool for turning the ring 23 to move the locking dogs 20 into and out-of engagement with the pockets 19 of the ring 15. A latch 26 is pivotally attached to ring 18 adapted to engage the ratchet teeth 27 formed in the outer periphery of the rotatable ring to secure the ring in its adjusted position. A spring 28 attached to the ring 18, normally holds the latch 26 in engagement with the ratchet teeth 27 to prevent accidental rotation of the ring when in locked position.

In operation, the tire is placed on the rim 7 and then the demountable flange 14 is mounted over the fixed ring 18. The lugs 16 on the flange engage in the openings 17 of the face plate 13 and secure the flange against rotation. In order that the demountable flange 14 may be slipped over the fixed ring, the rotatable ring 23 is rotated to the left to retract the locking dogs 20, as shown in Fig. 3. After the demountable flange is in place, the ring 23 is rotated to the right to project the locking dogs into engagement with the pockets 19 thus securely locking the demountable flange in operative position. The latch 26 engages the ratchet teeth 27 formed on the rotatable ring and secures the ring against accidental rotation in one direction.

It is to be understood that the form of invention shown herein is to be considered as a preferred example of the same and that changes in the shape, size and arrangement of the parts may be made within the scope of the subjoined claims.

Having thus described my invention, I claim:

1. A combined wheel and rim comprising a disk wheel, a fixed rim section secured to the periphery of said disk wheel, a separable rim section having pockets formed on its outer face, a ring rotatably mounted on the outer face of said disk wheel, locking dogs pivotally attached to said rotatable ring, and guide loops intermediate said ring and pockets to receive and direct said locking dogs into and out-of engagement with the pockets of said separable rim section upon rotation of said ring.

2. A combined wheel and rim comprising a disk wheel, a fixed rim section secured to the periphery of the disk wheel, a separable rim section having pockets formed in its outer face, a rotatable ring mounted on the outer face of the disk wheel, a fixed ring surrounding said rotatable ring, guide loops mounted on said fixed ring, and locking dogs pivotally mounted on said rotatable ring adapted to extend through said guide loops, the free ends of said locking dogs being movable by said guide loops into and out-of engagement with the pockets of said separable ring section upon rotation of said rotatable ring.

3. A combined wheel and rim comprising a disk wheel, a fixed rim section secured to the periphery of the disk wheel, a separable rim section having pockets formed in its outer face, a rotatable ring mounted on the outer face of the disk wheel, a fixed ring surrounding said rotatable ring, guide loops mounted on said fixed ring, locking dogs pivotally mounted on said rotatable ring adapted to extend through said guide loops, the free ends of said locking dogs being movable by said guide loops into and out-of engagement with the pockets of said separable ring section upon rotation of said rotatable ring, ratchet teeth formed on the periphery of said rotatable ring, and a latch engageable with said ratchet teeth for securing said rotatable ring in its locking position.

FRANK W. KING.

REFERENCES CITED

The following references are of record in the file of this patent:

UNITED STATES PATENTS

| Number | Name | Date |
|---|---|---|
| 1,382,672 | Racier | June 28, 1921 |
| 1,805,083 | Ferro | May 12, 1931 |
| 2,212,592 | Manghi | Aug. 27, 1940 |
| 2,272,575 | Organ | Feb. 10, 1942 |

FOREIGN PATENTS

| Number | Country | Date |
|---|---|---|
| 6,593 | Great Britain | 1910 |
| 22,635 | Great Britain | 1913 |
| 234,337 | Great Britain | 1925 |